United States Patent
Todd et al.

(10) Patent No.: US 9,317,820 B1
(45) Date of Patent: Apr. 19, 2016

(54) SYSTEM AND METHOD FOR CONFIGURING A CLOUD COMPUTING SPACE

(75) Inventors: Stephen J. Todd, Shrewsbury, MA (US); Michel F. Fisher, Natick, MA (US)

(73) Assignee: EMC Corporation, Hopkinton, MA (US)

(*) Notice: Subject to any disclaimer, the term of this patent is extended or adjusted under 35 U.S.C. 154(b) by 1029 days.

(21) Appl. No.: 12/751,124

(22) Filed: Mar. 31, 2010

(51) Int. Cl.
| | |
|---|---|
| *G06F 17/30* | (2006.01) |
| *G06Q 30/00* | (2012.01) |
| *G06Q 99/00* | (2006.01) |
| *G06Q 10/06* | (2012.01) |
| *G06Q 40/04* | (2012.01) |
| *G06F 21/10* | (2013.01) |

(52) U.S. Cl.
CPC ............. *G06Q 10/06* (2013.01); *G06Q 40/04* (2013.01); *G06F 21/10* (2013.01)

(58) Field of Classification Search
CPC ..... G06Q 10/06; G06Q 40/04; G06Q 50/188; G06F 21/10
USPC .................................... 715/735; 709/223, 226
See application file for complete search history.

(56) References Cited

U.S. PATENT DOCUMENTS

| | | | | |
|---|---|---|---|---|
| 6,721,748 | B1 * | 4/2004 | Knight | G06F 17/30702 |
| 7,188,179 | B1 * | 3/2007 | Hanson | H04L 12/5692 |
| | | | | 709/227 |
| 7,376,898 | B1 * | 5/2008 | Yehuda | G06F 21/6218 |
| | | | | 709/225 |
| 7,379,990 | B2 * | 5/2008 | Tsao | 709/223 |
| 7,457,771 | B2 * | 11/2008 | Grimes | G06Q 30/0613 |
| | | | | 705/1.1 |
| 7,506,265 | B1 * | 3/2009 | Traut et al. | 715/763 |
| 9,116,731 | B2 * | 8/2015 | Tung | G06F 9/45533 |
| 2001/0054008 | A1 * | 12/2001 | Miller | G06Q 30/0225 |
| | | | | 705/26.1 |
| 2002/0051174 | A1 * | 5/2002 | Betts | G06F 17/211 |
| | | | | 358/1.15 |
| 2002/0069369 | A1 * | 6/2002 | Tremain | 713/201 |
| 2002/0087332 | A1 * | 7/2002 | Como | G06Q 10/06 |
| | | | | 705/1.1 |
| 2003/0033238 | A1 * | 2/2003 | Oskielunas | G06Q 30/08 |
| | | | | 705/37 |
| 2003/0055723 | A1 * | 3/2003 | English | G06Q 30/02 |
| | | | | 705/14.51 |
| 2004/0059583 | A1 * | 3/2004 | O'Neill | G06Q 10/10 |
| | | | | 705/320 |
| 2006/0021014 | A1 * | 1/2006 | Hartman et al. | 726/6 |
| 2007/0220509 | A1 * | 9/2007 | Shwartz et al. | 717/174 |
| 2008/0126279 | A1 * | 5/2008 | Keeton et al. | 706/19 |
| 2010/0034364 | A1 * | 2/2010 | Kilfoyle | H04L 12/2872 |
| | | | | 379/93.01 |
| 2010/0063830 | A1 * | 3/2010 | Kenedy | G06Q 50/22 |
| | | | | 705/2 |
| 2010/0235287 | A1 * | 9/2010 | Lymbery et al. | 705/80 |
| 2011/0055714 | A1 * | 3/2011 | Vemulapalli et al. | 715/739 |

OTHER PUBLICATIONS

Tanner, John C, Cloudy future for widgets and web apps., Jun. 1, 2010, Telecom Asia (1681-181X) . vol. 21,Iss.5;p. 24-26.*

* cited by examiner

*Primary Examiner* — Jordany Nunez
(74) *Attorney, Agent, or Firm* — Brian J. Colandreo; Mark H. Whittenberger; Holland & Knight LLP

(57) ABSTRACT

A system, computer-implemented method, and a computer program product for configuring a requirements model for a cloud computing space includes defining a list of available system capabilities within the cloud computing space. A user is allowed to define one or more user requirements chosen from the list of available system capabilities. The one or more user requirements are associated with one or more hardware/software requirements. A cloud computing solution is configured based, at least in part, upon the one or more user requirements and the one or more hardware/software requirements.

18 Claims, 8 Drawing Sheets

SYSTEM AND METHOD FOR CONFIGURING A CLOUD COMPUTING SPACE

TECHNICAL FIELD

This disclosure relates to configuration systems and, more particularly, to systems for configuring a cloud computing space.

BACKGROUND

Cloud computing spaces typically include various combinations of hardware and software that allow for various users to configure a portion of the cloud computing space to accomplish a desired task. For example, a scientific user may desire a higher level of computational power while a government organization may require a higher level of data security. Accordingly, the various resources (i.e., both hardware and software) may be configured in accordance with the needs of the individual user.

Unfortunately, as cloud computing spaces grow, products by various hardware and software vendors are typically interspersed for various reasons (e.g., economics, lack of availability, lack of suitability, and death of a product line). Accordingly, when configuring a cloud computing space, the process is often complicated as many disparate procedures may need to be followed to properly address the needs of the user. Further, the user requirements may need to be cobbled together as a set of discrete, manual steps that may require the use of tools designed by different vendors. Unfortunately, this may result in complete disruption over time when replacing vendors with new equipment.

SUMMARY OF DISCLOSURE

In one implementation, a method of configuring a requirements model for a cloud computing space includes defining a list of available system capabilities within the cloud computing space. A user is allowed to define one or more user requirements chosen from the list of available system capabilities. The one or more user requirements are associated with one or more hardware/software requirements. A cloud computing solution is configured based, at least in part, upon the one or more user requirements and the one or more hardware/software requirements.

One or more of the following features may be included. The list of available system capabilities may include one or more of: application capabilities; capacity capabilities; performance capabilities; backup capabilities; disaster recovery capabilities; and security capabilities.

Allowing a user to define one or more user requirements may include allowing a user to define one or more user requirements using one or more selection menus. Configuring a cloud computing solution may include sending one or more API-requests to one or more hardware/software entities associated, in whole or in part, with the one or more hardware/software requirements. The requirements model may be stored at one or more locations. Storing the requirements model at one or more locations may include storing the requirements model in two or more locations, wherein at least one of the two or more locations is a disaster recovery location.

The list of available system capabilities may be defined, at least in part, by one or more hardware devices and one or more software applications included within the cloud computing space. Associating the one or more user requirements with one or more hardware/software requirements may include defining the one or more hardware/software requirements based upon the requirements of the one or more hardware devices and the one or more software applications included within the cloud computing space.

In another implementation, a computer program product resides on a computer readable medium having a plurality of instructions stored on it. When executed by a processor, the instructions cause the processor to perform operations including defining a list of available system capabilities within a cloud computing space. A user is allowed to define one or more user requirements chosen from the list of available system capabilities. The one or more user requirements are associated with one or more hardware/software requirements. A cloud computing solution is configured based, at least in part, upon the one or more user requirements and the one or more hardware/software requirements One or more of the following features may be included. The list of available system capabilities may include one or more of: application capabilities; capacity capabilities; performance capabilities; backup capabilities; disaster recovery capabilities; and security capabilities.

Allowing a user to define one or more user requirements may include allowing a user to define one or more user requirements using one or more selection menus. Configuring a cloud computing solution may include sending one or more API-requests to one or more hardware/software entities associated, in whole or in part, with the one or more hardware/software requirements. A requirements model may be stored at one or more locations. Storing the requirements model at one or more locations may include storing the requirements model in two or more locations, wherein at least one of the two or more locations is a disaster recovery location.

The list of available system capabilities may be defined, at least in part, by one or more hardware devices and one or more software applications included within the cloud computing space. Associating the one or more user requirements with one or more hardware/software requirements may include defining the one or more hardware/software requirements based upon the requirements of the one or more hardware devices and the one or more software applications included within the cloud computing space.

In another implementation, a cloud configuration system includes at least one processor, and at least one memory architecture coupled with the at least one processor. A first software module is executed on the at least one processor and the at least one memory architecture. The first software module is configured to define a list of available system capabilities within a cloud computing space. A second software module is executed on the at least one processor and the at least one memory architecture. The second software module is configured to allow a user to define one or more user requirements chosen from the list of available system capabilities. A third software module is executed on the at least one processor and the at least one memory architecture. The third software module is configured to associate one or more user requirements with one or more hardware/software requirements. A fourth software module is executed on the at least one processor and the at least one memory architecture. The fourth software module is configured to configure a cloud computing solution based, at least in part, upon the one or more user requirements and the one or more hardware/software requirements One or more of the following features may be included. The list of available system capabilities may include one or more of: application capabilities; capacity capabilities; performance capabilities; backup capabilities; disaster recovery capabilities; and security capabilities.

Allowing a user to define one or more user requirements may include allowing a user to define one or more user requirements using one or more selection menus. Configuring a cloud computing solution may include sending one or more API-requests to one or more hardware/software entities associated, in whole or in part, with the one or more hardware/software requirements. A requirements model may be stored at one or more locations. Storing the requirements model at one or more locations may include storing the requirements model in two or more locations, wherein at least one of the two or more locations is a disaster recovery location.

The list of available system capabilities may be defined, at least in part, by one or more hardware devices and one or more software applications included within the cloud computing space. Associating the one or more user requirements with one or more hardware/software requirements may include defining the one or more hardware/software requirements based upon the requirements of the one or more hardware devices and the one or more software applications included within the cloud computing space.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
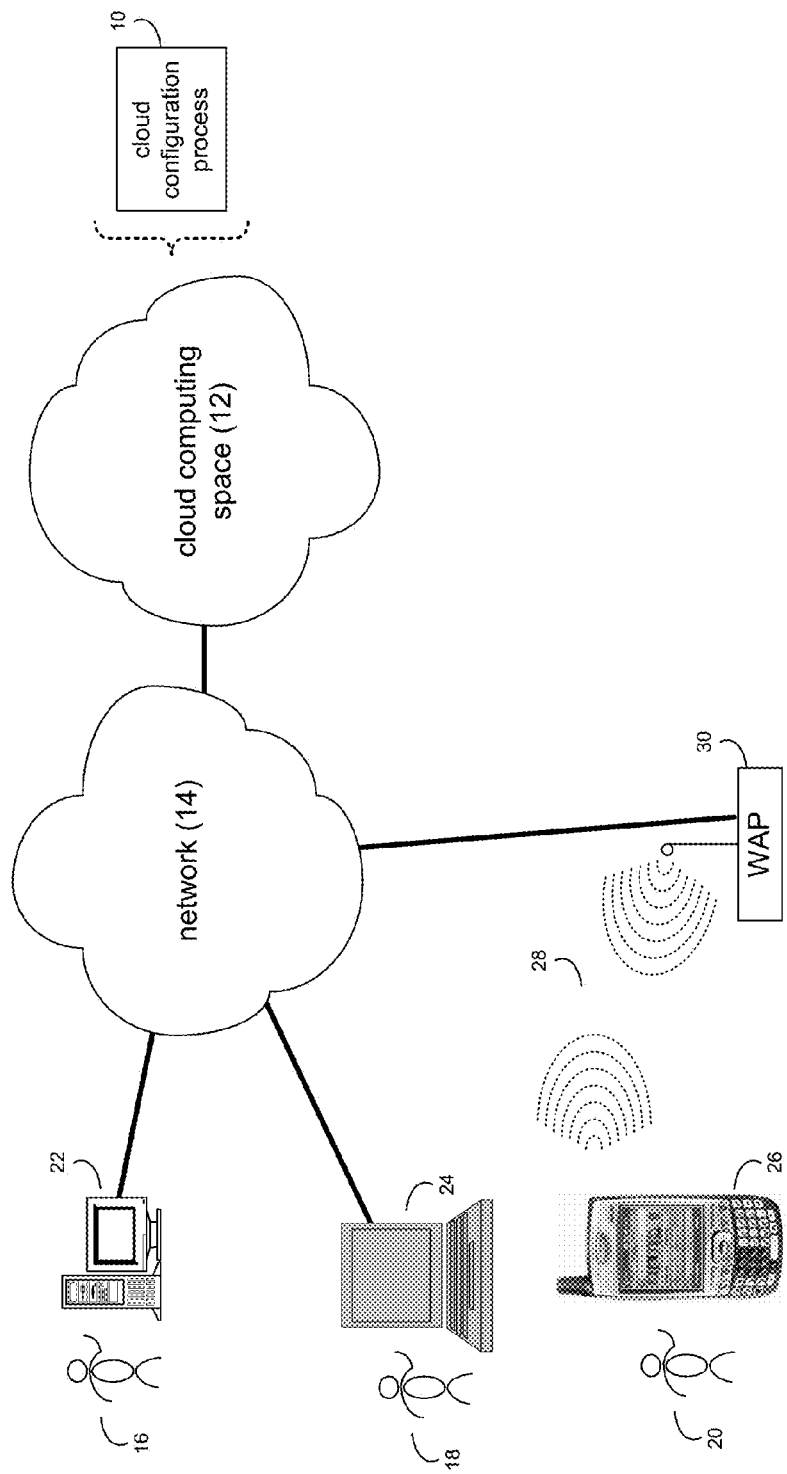
FIG. 1 is a diagrammatic view of a cloud computing space coupled to a distributed computing network.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
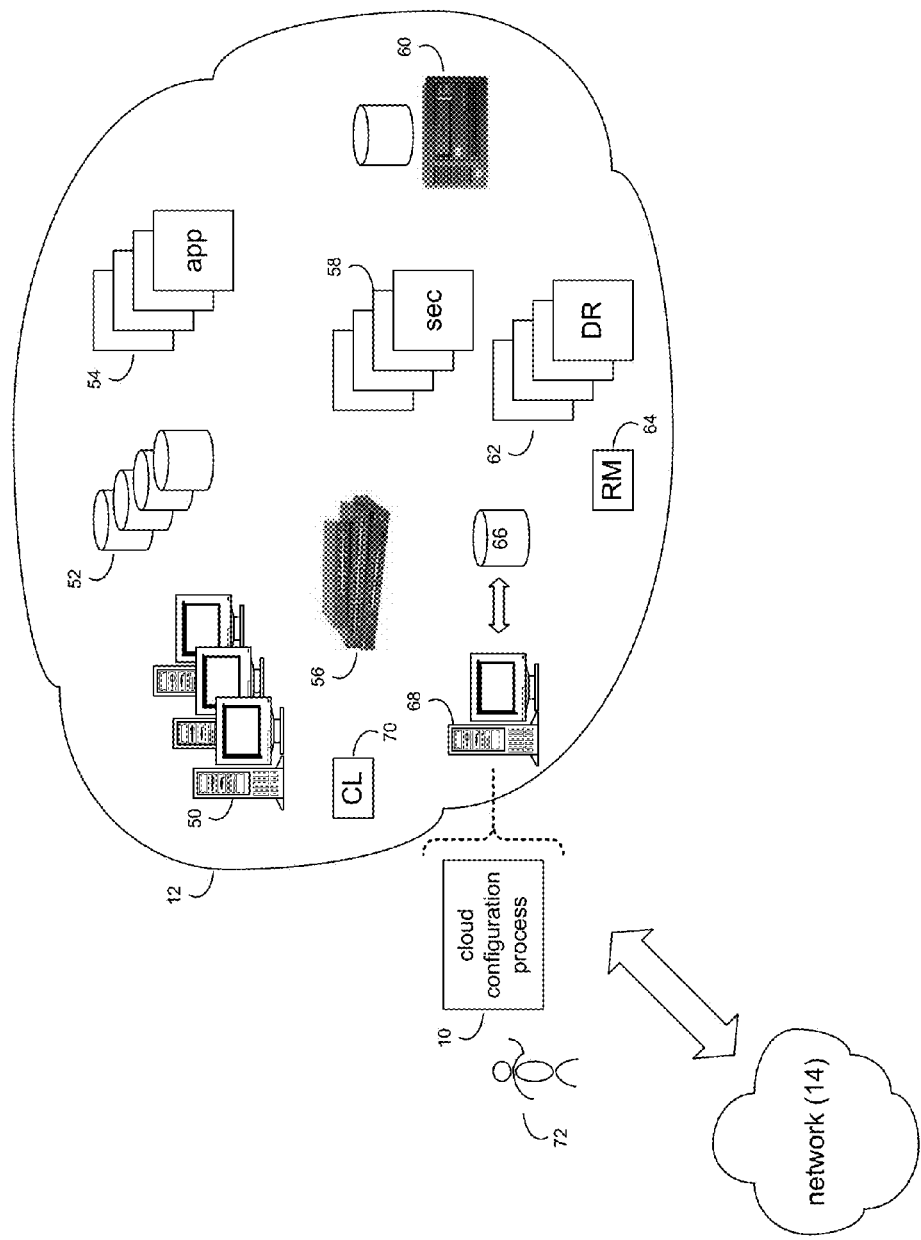
FIG. 2 is a diagrammatic view of the cloud computing space of FIG. 1.

Referring to FIGS. 1 & 2, there is shown cloud configuration process 10 that may be used to configure cloud computing space 12, which may be connected to network 14 (e.g., the Internet or a local area network). As is known in the art, a cloud computing space (e.g., cloud computing space 12) is a computing capability that provides a level of abstraction between the computing resource and its underlying physical architecture. Accordingly, cloud computing spaces may provide users with a level of on-demand computational access via a shared pool of configurable computing resources that may be provisioned in accordance with the needs of the various individual users of the cloud computing space.

Cloud computing space 12 may include a plurality of hardware-device and software-application capabilities that may be configured based upon the individual needs of the various users of cloud computing space 12. Examples of such capabilities may include but are not limited to: computing resources 50 (e.g., servers, main frames, mini-computers, super-computers); storage resources 52 (e.g., hard disks, RAID arrays, NAS systems, SAN systems, Content Addressable Storage systems); application resources 54 (e.g., scientific applications, database applications, email applications); backbone resources 56 (e.g., routers, switches, firewalls); security resources 58 (e.g., encryption systems); backup resources 60 (e.g., tape backup, hard drive backup); and disaster recovery resources 62 (e.g., system standby, data standby/application deployment). While this list is intended to be illustrative, it is not intended to be all inclusive, as other configurations are possible and are considered to be within the scope of this disclosure.

Figure 3:
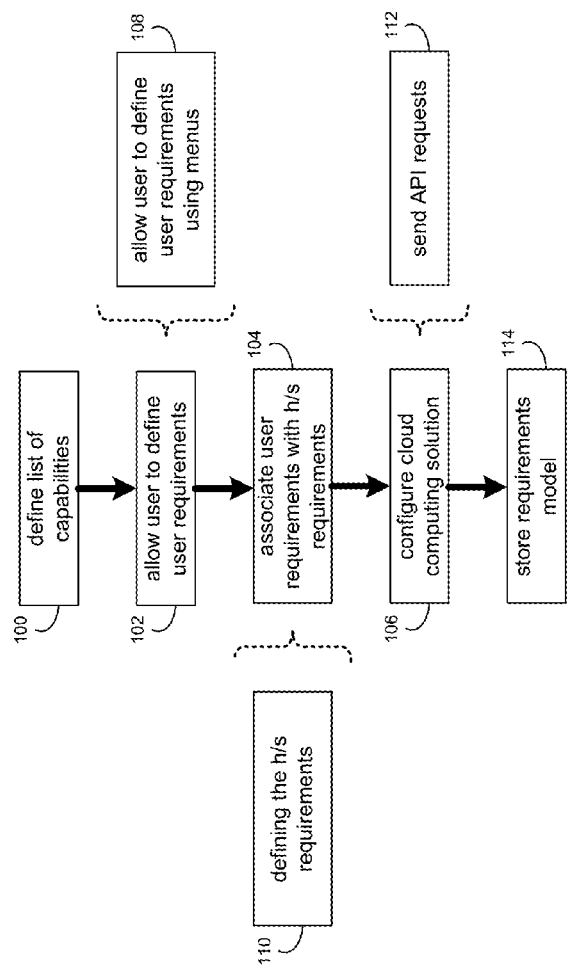
FIG. 3 is a flowchart of a cloud configuration process that may configure the cloud computing space of FIG. 1.

Referring also to FIG. 3 and as will be discussed below in greater detail, cloud configuration process 10 may configure a requirements model (e.g., requirements model 64) for a cloud computing space. Cloud configuration process 10 may define 100 a list of available system capabilities. A user may be allowed 102 to define one or more user requirements chosen from the list of available system capabilities. The one or more user requirements may be associated 104 with one or more hardware/software requirements. A cloud computing solution may be configured 106 based, at least in part, upon the one or more user requirements and the one or more hardware/software requirements.

The instruction sets and subroutines of cloud configuration process 10, which may be stored on storage device 66 coupled to administrative computer 68, may be executed by one or more processors (not shown) and one or more memory architectures (not shown) incorporated into administrative computer 68. Storage device 66 may include but is not limited to: a hard disk drive; a tape drive; an optical drive; a RAID array; a random access memory (RAM); and a read-only memory (ROM).

Administrative computer 68 may execute a web server application, examples of which may include but are not limited to: Microsoft IIS™, Novell Webserver™, or Apache Webserver™, that allows for HTTP (i.e., HyperText Transfer Protocol) access to administrative computer 68 via network 14. Network 14 may be connected to one or more secondary networks (not shown), examples of which may include but are not limited to: a local area network; a wide area network; or an intranet, for example.

Users 16, 18, 20 may access cloud configuration process 10 using client electronic devices 22, 24, 26 (respectively). Examples of client electronic devices 22, 24, 26 may include, but are not limited to, personal computer 22, laptop computer 24, personal digital assistant 26, a server computer (not shown), a notebook computer (not shown), a data-enabled, cellular telephone (not shown), and a dedicated network device (not shown). Client electronic devices 22, 24, 26 may each execute an operating system, examples of which may include but are not limited to Microsoft Windows™, Microsoft Windows CE™, Redhat Linux™, or a custom operating system.

The various client electronic devices may be directly or indirectly coupled to network 14. For example, personal computer 22 and laptop computer 24 are shown directly coupled to network 14 via a hardwired network connection. Further, personal digital assistant 26 is shown wirelessly coupled to network 14 via wireless communication channel 28 established between personal digital assistant 26 and wireless access point (i.e., WAP) 30, which is shown directly coupled to network 14. WAP 30 may be, for example, an IEEE 802.11a, 802.11b, 802.11g, 802.11n, Wi-Fi, and/or Bluetooth device that is capable of establishing wireless communication channel 28 between personal digital assistant 26 and WAP 30.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Cloud Configuration Process:

As discussed above, cloud computing space 12 may include a plurality of hardware-device and software-application capabilities that may be configured based upon the individual needs of the various users of cloud computing space 12. Examples of such capabilities may include but are not limited to: computing resources 50 (e.g., servers, main frames, mini-computers, super-computers); storage resources 52 (e.g., hard disks, RAID arrays, NAS systems, SAN systems, Content Addressable Storage); application resources 54 (e.g., scientific applications, database applications, email applications); backbone resources 56 (e.g., routers, switches, firewalls); security resources 58 (e.g., encryption systems); backup resources 60 (e.g., tape backup, hard drive backup); and disaster recovery resources 64 (e.g., system standby, data standby/application deployment).

Cloud configuration process 10 may define 100 a list (e.g., capabilities list 70) of available system capabilities. Capabilities list 70 may be defined, at least in part, by the above-described hardware devices and software applications included within the cloud computing space and may be configured so that the above-described hardware and software capabilities are logically grouped to allow for a simplified selection process by e.g., user 16. For example, capabilities list 70 may define high-level capabilities categories such as: application capabilities; capacity capabilities; performance capabilities; accessibility capabilities, backup capabilities; disaster recovery capabilities; and security capabilities.

The manner in which capabilities list 70 is defined 100 may vary depending on the manner in which cloud configuration process 10 is implemented. For example, capabilities list 70 may be manually defined or automatically defined. Specifically, cloud configuration process 10 may be configured to allow cloud administrator 72 to manually define and maintain a list of available system capabilities (i.e., capabilities list 70) included within cloud computing space 12. Accordingly, in the event that a Cisco™ fiber optic backbone is added to cloud computing space 12, cloud administrator 72 may manually append capabilities list 70 to include this newly-added capability.

Alternatively, capabilities list 70 may be automatically defined/maintained by cloud configuration process 10. For example, cloud configuration process 10 may be configured to automatically poll (via the use of various APIs) the various hardware and software based capabilities included within cloud computing space 12. In the event that new capabilities are identified, capabilities list 70 may be automatically updated by cloud configuration process 10.

Cloud configuration process 10 may be configured to allow 102 a user to define one or more user requirements chosen from capabilities list 70. For example, assume that user 16 is an IT administrator within a corporation (e.g., XYZ Corp) that maintains cloud computing space 12. Further, assume that XYZ Corp is establishing a marketing department that is going to require a portion of the capabilities of cloud computing space 12. For example, assume that for the marketing department, an email system is going to be needed and the system needs to support one hundred users. Further, assume that being it is a marketing department, large data files are often going to be transferred between users. Additionally, as the marketing department is going to play a critical role in XYZ Corp, the capabilities provided by cloud computing space 12 must be highly dependable (e.g., the mailboxes must be backed up and a disaster recovery plan must be in place).

Figure 4:
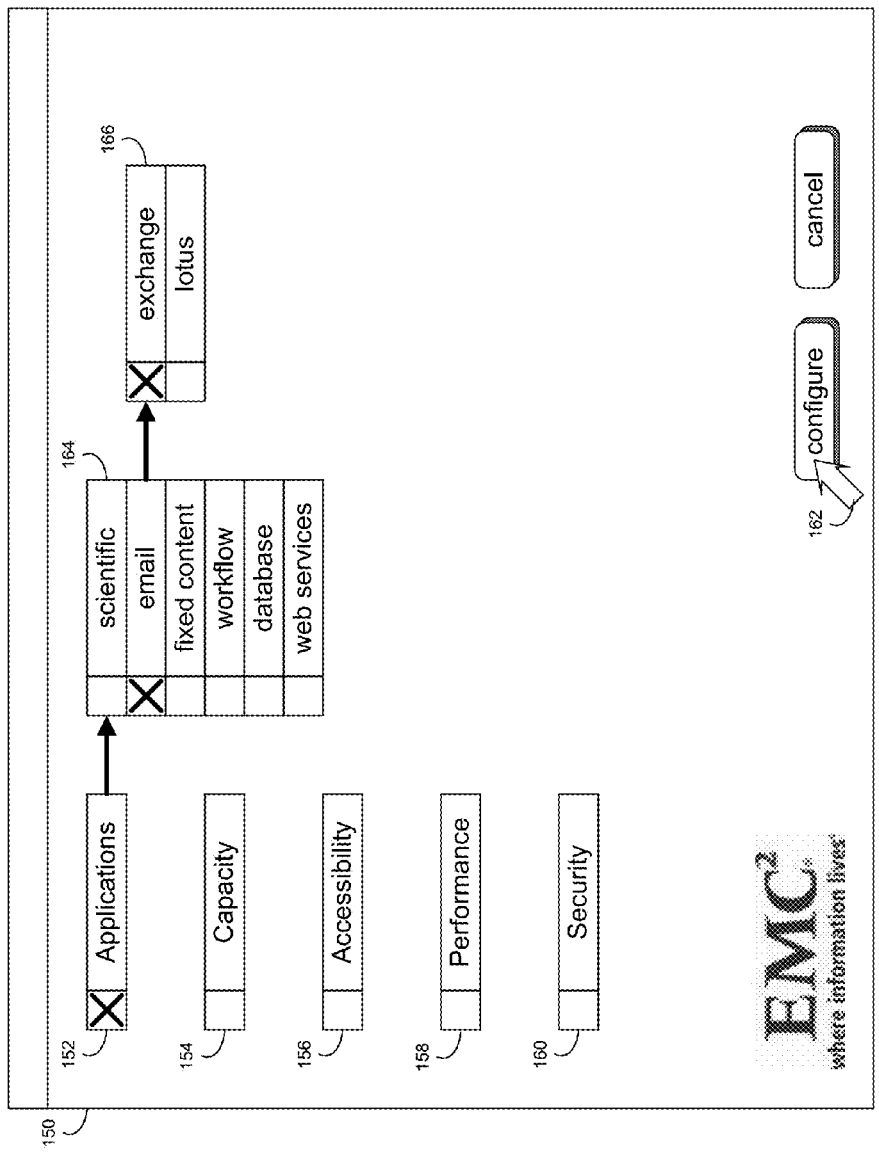
FIGS. 4-8 are various views of a user interface rendered by the cloud configuration process of FIG. 3.

As discussed above, administrative computer 68 may execute a web server application. Accordingly, user 16 may access administrative computer 68 via client electronic device 22. Referring also to FIG. 4, cloud configuration process 10 may render user interface 150 that may allow 108 user 16 to define the user requirements (which will be used to formulate requirements model 64) using various selection menus. For example, user interface 150 may define one or more of the above-described high-level capabilities categories. For illustrative purposes, assume that user interface 150 defines five high-level category options, namely: applications 152, capacity 154, accessibility 156, performance 158, and security 160. When selecting one or more of high-level category options 152, 154, 156, 158, 160 via e.g., pointer 162 controllable by a pointing device (not shown), one or more menus/submenus 164, 166 may be rendered by cloud configuration process 10.

As user 16 selects from the various high-level category options 152, 154, 156, 158, 160 (and the various related menus/submenus 164, 166), cloud configuration process 10 may use the selections made by user 16 to generate requirements model 64.

Referring also to FIGS. 5-8, there is shown various iterations of user interface 150 rendered by cloud configuration process 10 as user 16 defines their user requirements for cloud computing space 12. As user 16 defines their user requirements (which are used to generate requirements model 64), cloud configuration process 10 may associate 104 the user requirements (defined using e.g., high-level category options 152, 154, 156, 158, 160 and menus/submenus 164, 166) with one or more hardware/software requirements. For example, when user 16 selects Application option 152➔ email ➔ exchange, cloud configuration process 10 associates 104 this requirement of user 16 with the software platform Microsoft Exchange™. As a further example, when user 16 selects Accessibility option 156 and defines "protection" as "high", cloud configuration process 10 associates 104 this requirement of user 16 with a RAID hardware platform.

When associating 104 the requirements of user 16 with hardware/software requirements, cloud configuration process 10 may define 110 these hardware/software requirements based upon the requirements of the various hardware devices and the various software applications included within cloud computing space 12. Accordingly, cloud configuration process 10 may establish one or more rules that may be mapped to various hardware and software capabilities included within cloud computing space 12. For example, when setting up Microsoft Exchange™, 1.0 gigabytes of storage space may be set aside for each account configured. Accordingly, when cloud configuration process 10 is configuring Microsoft Exchange™ for one hundred users, one hundred gigabytes of storage space (from cloud computing space 12) may be defined 110 for this installation of Microsoft Exchange™.

As shown in FIGS. 4-8, when user 16, via cloud configuration process 10, defines their user requirements (which are subsequently used to generate requirements model 64), various options (and sub-options) may be defined.

In one illustrative example, the options may be as follows:

Applications Option 152 (as shown in FIG. 4):

Application➔ Scientific➔ Oil & Gas

Application➔ Scientific➔ Astronomy

Application➔ Email➔ Exchange

Application➔ Email➔ Lotus

Application➔ Fixed Content➔ Medical Imaging

Application➔ Fixed Content➔ Digital Preservation

Application➔ Workflow➔ Mortgage/Insurance Applications

Application➔ Workflow➔ Customer Care

Application➔ Database➔ Financial

Application➔ Database➔ eCommerce

Application➔ Web services➔ Social Media

Application➔ Web services➔ Cloud Services

Figure 5:
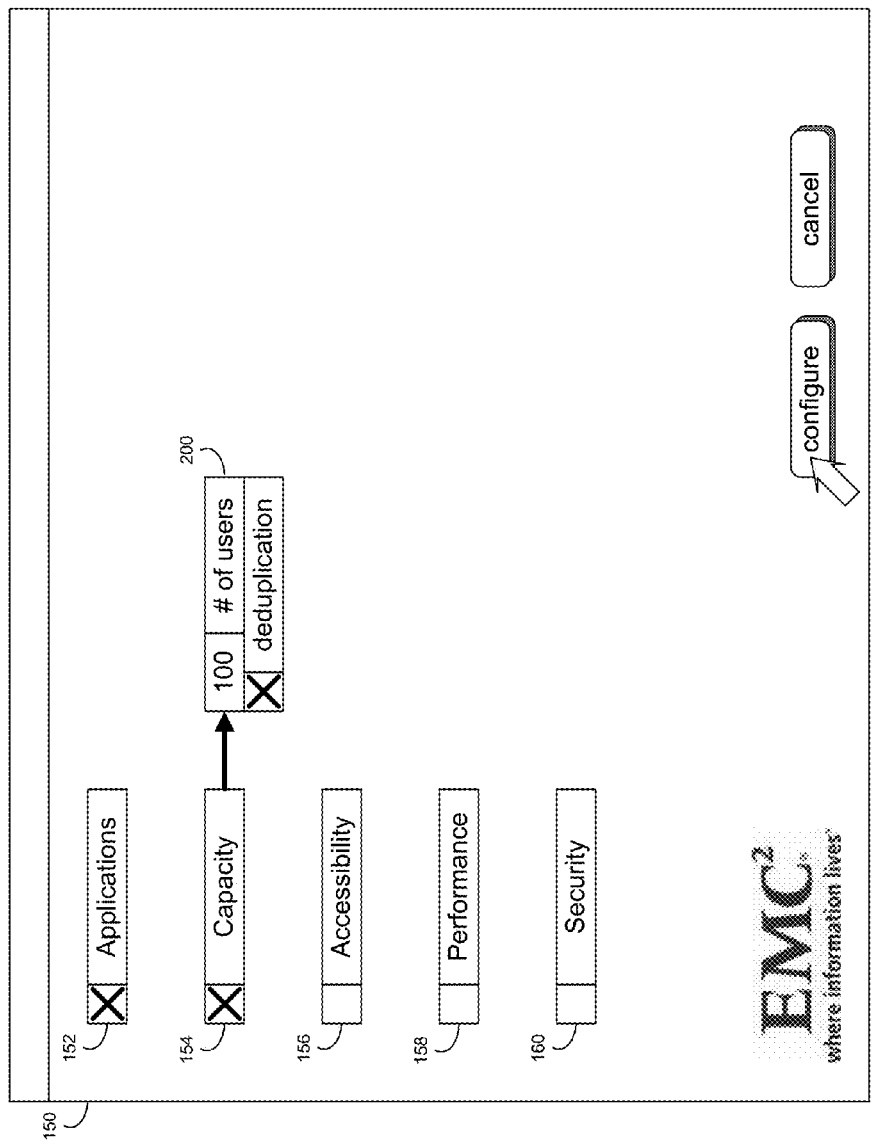

Capacity Option 154 (as shown in FIG. 5):

May allow user 16 to define various options that may include but are not limited to: the number of users for the email system, the number of customers for a workflow, the number of measurements for the storage of scientific data, the number of images for medical imaging applications, the size of the business for financial applications. Typically these quantities are basic indicators that translate into capacity requirements for storage.

May allow user 16 to select a "deduplication" option that may allow for data reduction by eliminating duplicate files and blocks on primary data stores, secondary (i.e., backup) data stores, and disaster recovery sites.

Figure 6:
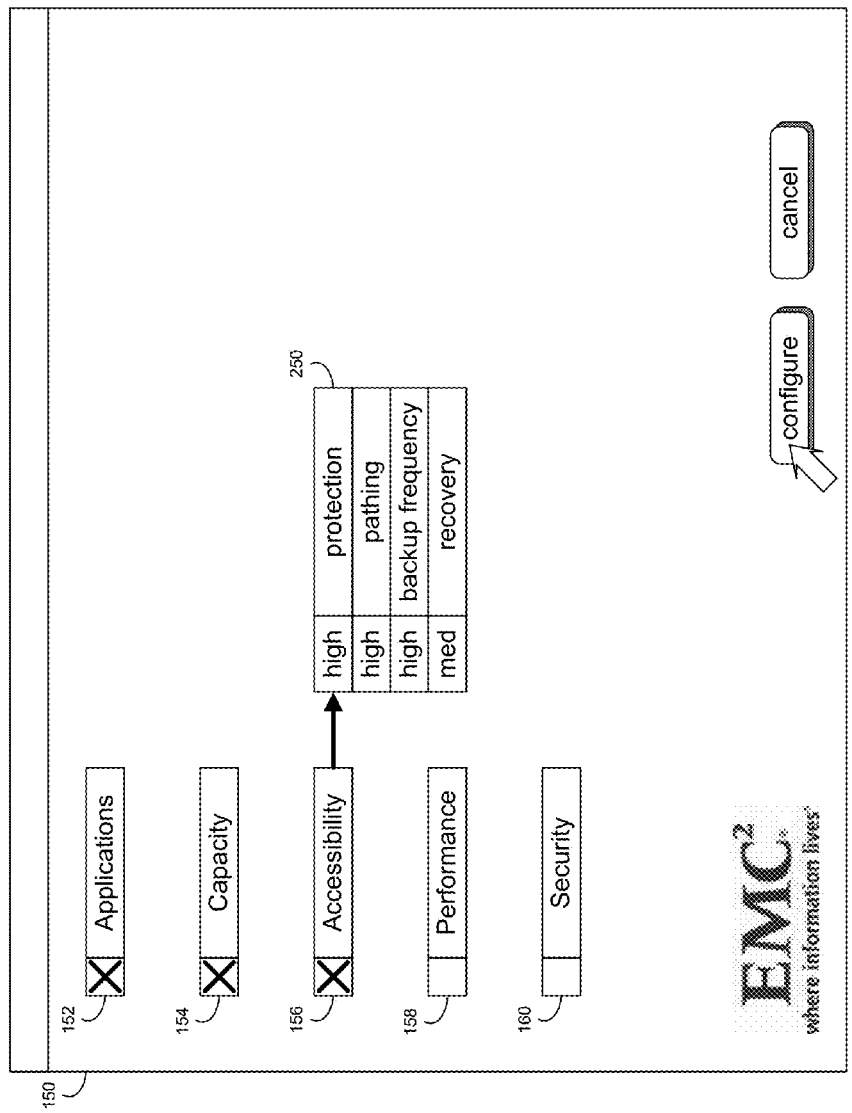

Accessibility Option 156 (as shown in FIG. 6):

May allow user 16 to define the level of protection of data (none/low/medium/high) that may translate into e.g., RAID 0, RAID 1, RAID 5, and RAID 6.

May allow user 16 to define pathing options (e.g., none/low/medium/high) that may translate into e.g., the number of paths to disk storage via e.g., networks/host bus adapters/ports, and the level of application availability between servers (e.g., if server fails, the virtual machine and subject application is quickly available on another server).

May allow user 16 to define the backup frequency (e.g., none, low, medium, high, instant).

May allow user 16 to define the disaster recovery options (e.g., none, medium—up and running within 24 hours—, immediate-resources pre-provisionined at remote site and "warm standby" of entire infrastructure).

Figure 7:
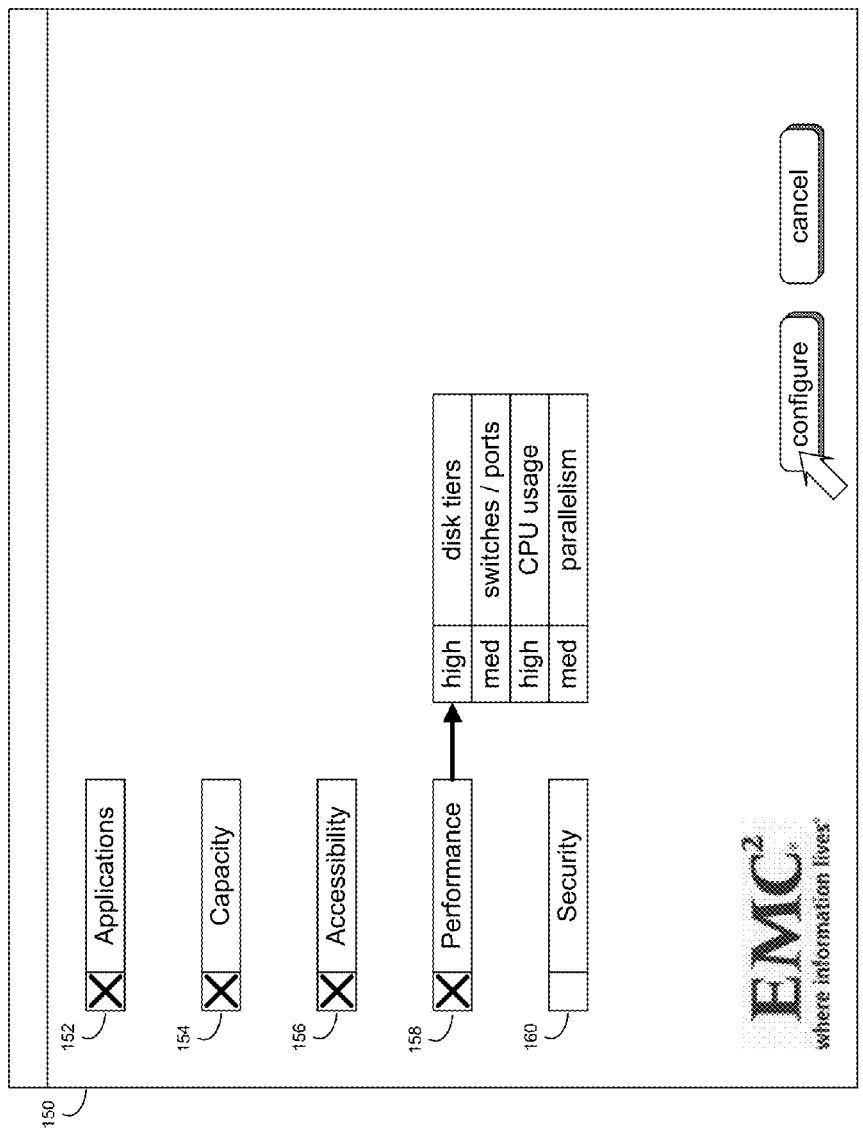

Performance Option 158 (as shown in FIG. 7);

May allow user 16 to define various options such as the availability of disk tiers (e.g., SATA, fiber channel, flash drives), fast network switches/ports, CPU usage, and parallelism (4, 16, 32 node grid jobs)

Figure 8:
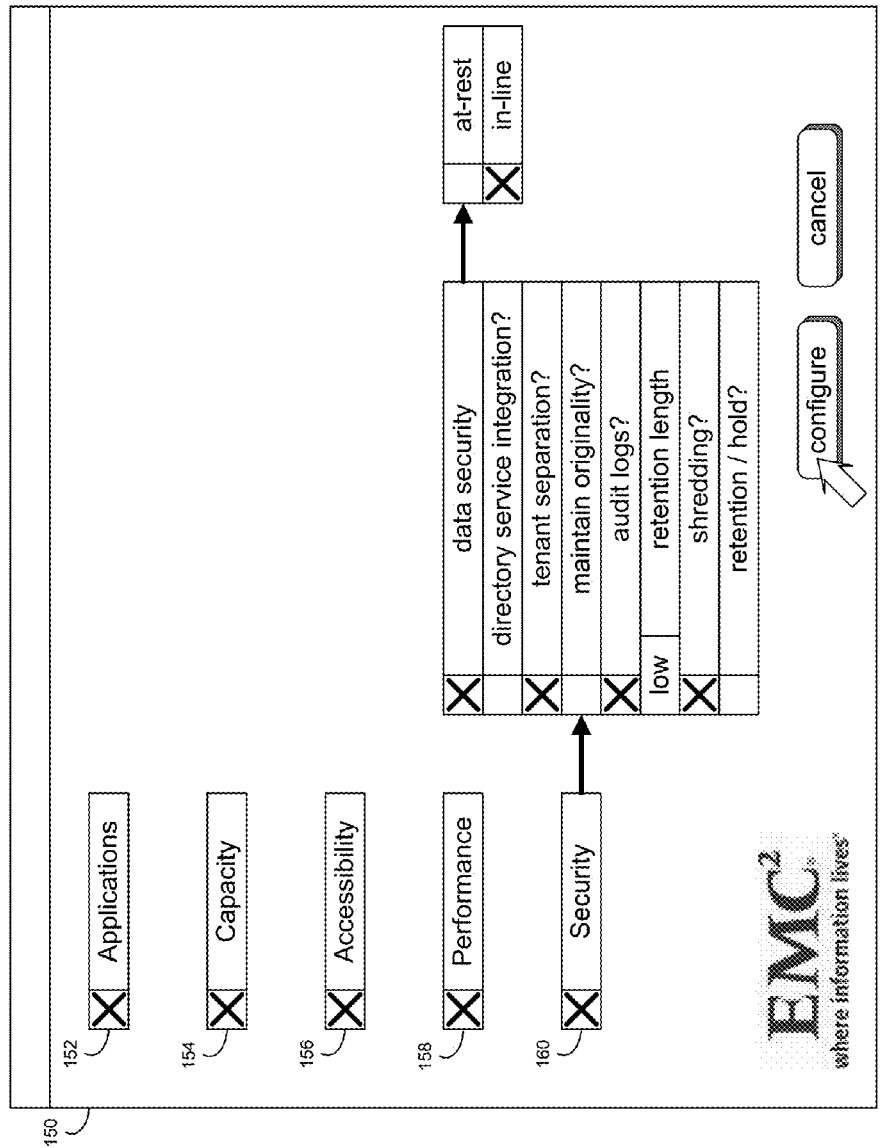

Security Option 160 (as shown in FIG. 8)

May allow user 16 to define a level of data security (e.g., at-rest encryption, in-line encryption).

May allow user 16 to define a level of directory service integration (e.g., LDAP-style security).

May allow user 16 to request separation amongst the users of cloud computing space 12.

May allow user 16 to request maintenance of originally written content.

May allow user 16 to request audit logs.

May allow user 16 to define a retention length (e.g., none, low, medium, high).

May allow user 16 to request data shredding capabilities.

May allow user 16 to request retention/hold for data.

As discussed above, once user 16 completes the process of defining their user requirements, cloud configuration process 10 may use the selections made by user 16 and the above-described hardware/software requirements to generate requirements model 64. Requirements model 64 may be stored 114 at one or more locations within or outside of cloud computing space 12. For example, if high availability of data is not an issue, a single copy of requirements model 64 may be stored within cloud computing space 12. If high availability is an important issue, one or more redundant copies of requirements model 64 may be stored either within cloud computing space 12 or at a remote disaster recovery location. Accordingly, in the event of a failure of all or a portion of cloud computing space 12, a remote disaster recovery site may be configured (either proactively or reactively) based upon requirements model 64.

Cloud configuration process 10 may then configure 106 a cloud computing solution based, at least in part, upon requirements model 64 (which is based, at least in part, upon the user requirements and the one or more hardware/software requirements).

When configuring 106 the cloud computing solution, cloud configuration process 10 may send 112 one or more API-requests to the various hardware devices/software applications associated, in whole or in part, with the one or more hardware/software requirements. As discussed above, when cloud configuration process 10 is configuring Microsoft Exchange™ for one hundred users, one hundred gigabytes of storage space (from cloud computing space 12) may be defined 110 for this installation of Microsoft Exchange™. Accordingly, when configuring 106 the cloud computing solution, cloud configuration process 10 may send 112 one or more API-requests to a storage device included within cloud computing space 12 so that: a one hundred gigabyte storage partition may be established for the Microsoft Exchange™ installation of user 16; a data backup system may be configured, ports may be allocated, switches may be configured; and processor power may be allocated, for example.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

A number of implementations have been described. Nevertheless, it will be understood that various modifications may be made. Accordingly, other implementations are within the scope of the following claims.

What is claimed is:

1. A method of configuring a requirements model for a cloud computing space comprising:
defining a list of available system capabilities within the cloud computing space;
allowing a user to define one or more user requirements chosen from the list of available system capabilities from a user interface including a plurality of menus and submenus displaying the list of available system capabilities, wherein upon expansion of one of the plurality of menus and submenus, displaying different vendors that offer the available system capability;
associating the one or more user requirements with one or more hardware and software requirements;
configuring a cloud computing solution based, at least in part, upon the one or more user requirements and the one or more hardware and software requirements;
polling the cloud computing space for new available system capabilities, including new hardware and software capabilities and new options within the hardware and software capabilities;
sending one or more API-requests to one or more hardware and software entities associated, in whole or in part, with the one or more hardware and software requirements;

wherein the one or more API-requests define pathing options and backup frequency for the cloud computing solution; and configuring a remote disaster recovery site based, at least in part, upon the one more user requirements and the one or more hardware and software requirements.

2. The method of claim 1 wherein the list of available system capabilities includes one or more of:
application capabilities;
capacity capabilities;
performance capabilities;
backup capabilities;
disaster recovery capabilities; and
security capabilities.

3. The method of claim 1 wherein allowing a user to define one or more user requirements includes:
allowing a user to define one or more user requirements using one or more selection menus.

4. The method of claim 1 further comprising:
storing the requirements model at one or more locations.

5. The method of claim 4 wherein storing the requirements model at one or more locations includes:
storing the requirements model in two or more locations, wherein at least one of the two or more locations is a disaster recovery location.

6. The method of claim 1 wherein:
the list of available system capabilities is defined, at least in part, by one or more hardware devices and one or more software applications included within the cloud computing space; and
associating the one or more user requirements with one or more hardware and software requirements includes:
defining the one or more hardware and software requirements based upon the requirements of the one or more hardware devices and the one or more software applications included within the cloud computing space.

7. A computer program product residing on a non-transitory computer readable medium having a plurality of instructions stored thereon that, when executed by a processor, cause the processor to perform operations comprising:
defining a list of available system capabilities within a cloud computing space;
allowing a user to define one or more user requirements chosen from the list of available system capabilities from a user interface including a plurality of menus and submenus displaying the list of available system capabilities, wherein upon expansion of one of the plurality of menus and submenus, displaying different vendors that offer the available system capability;
associating the one or more user requirements with one or more hardware and software requirements;
configuring a cloud computing solution based, at least in part, upon the one or more user requirements and the one or more hardware and software requirements;
polling the cloud computing space for new available system capabilities, including new hardware and software capabilities and new options within the hardware and software capabilities;
sending one or more API-requests to one or more hardware and software entities associated, in whole or in part, with the one or more hardware and software requirements; wherein the one or more API-requests define pathing options and backup frequency for the cloud computing solution; and
configuring a remote disaster recovery site based, at least in part, upon the one more user requirements and the one or more hardware and software requirements.

8. The computer program product of claim 7 wherein the list of available system capabilities includes one or more of:
application capabilities;
capacity capabilities;
performance capabilities;
backup capabilities;
disaster recovery capabilities; and
security capabilities.

9. The computer program product of claim 7 wherein the instructions for allowing a user to define one or more user requirements include instructions for:
allowing a user to define one or more user requirements using one or more selection menus.

10. The computer program product of claim 7 further comprising instructions for:
storing a requirements model at one or more locations.

11. The computer program product of claim 10 wherein the instructions for storing the requirements model at one or more locations include instructions for:
storing the requirements model in two or more locations, wherein at least one of the two or more locations is a disaster recovery location.

12. The computer program product of claim 7 wherein:
the list of available system capabilities is defined, at least in part, by one or more hardware devices and one or more software applications included within the cloud computing space; and
the instructions for associating the one or more user requirements with one or more hardware and software requirements include instructions for:
defining the one or more hardware and software requirements based upon the requirements of the one or more hardware devices and the one or more software applications included within the cloud computing space.

13. A computing system comprising:
at least one processor;
at least one memory architecture coupled with the at least one processor;
a first software module executed on the at least one processor and the at least one memory architecture, wherein the first software module is configured to define a list of available system capabilities within the cloud computing space;
a second software module executed on the at least one processor and the at least one memory architecture, wherein the second software module is configured to allow a user to define one or more user requirements chosen from the list of available system capabilities from a user interface including a plurality of menus and submenus displaying the list of available system capabilities, wherein upon expansion of one of the plurality of menus and submenus, displaying different vendors that offer the available system capability;
a third software module executed on the at least one processor and the at least one memory architecture, wherein the third software module is configured to associate the one or more user requirements with one or more hardware and software requirements;
a fourth software module executed on the at least one processor and the at least one memory architecture, wherein the fourth software module is configured to configure a cloud computing solution based, at least in part, upon the one or more user requirements and the one or more hardware and software requirements;
a fifth software module executed on the at least one processor and the at least one memory architecture, wherein the fifth software module is configured to poll the cloud computing space for new available system capabilities, including new hardware and software capabilities and new options within the hardware and software capabilities;

a sixth software module executed on the at least one processor and the at least one memory architecture, wherein the sixth software module is configured to send one or more API-requests to one or more hardware and software entities associated, in whole or in part, with the one or more hardware and software requirements; wherein the one or more API-requests define pathing options and backup frequency for the cloud computing solution; and a seventh software module executed on the at least one processor and the at least one memory architecture, wherein the seventh software module is configured to configure a remote disaster recovery site based, at least in part, upon the one more user requirements and the one or more hardware and software requirements.

14. The computing system of claim 13 wherein the list of available system capabilities includes one or more of:
application capabilities;
capacity capabilities;
performance capabilities;
backup capabilities;
disaster recovery capabilities; and
security capabilities.

15. The computing system of claim 13 wherein allowing a user to define one or more user requirements includes:
allowing a user to define one or more user requirements using one or more selection menus.

16. The computing system of claim 13 further comprising an eighth software module executed on the at least one processor and the at least one memory architecture, wherein the eighth software module is configured to:
store the requirements model at one or more locations.

17. The computing system of claim 16 wherein storing the requirements model at one or more locations includes:
storing the requirements model in two or more locations, wherein at least one of the two or more locations is a disaster recovery location.

18. The computing system of claim 13 wherein:
the list of available system capabilities is defined, at least in part, by one or more hardware devices and one or more software applications included within the cloud computing space; and
associating the one or more user requirements with one or more hardware and software requirements includes:
defining the one or more hardware and software requirements based upon the requirements of the one or more hardware devices and the one or more software applications included within the cloud computing space.

* * * * *